(No Model.)
S. BRADLEY.
MACHINE FOR MAKING LIGHTNING ROD CONNECTIONS.
No. 323,105. Patented July 28, 1885.
FIG. I.
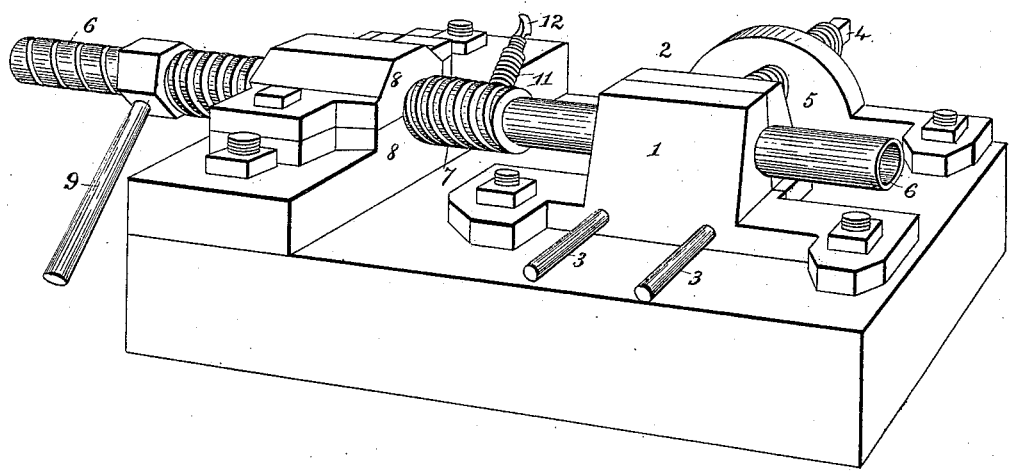
FIG. II.
FIG. III.
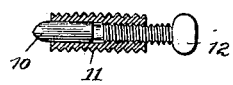
ATTEST.
Geo. T. Smallwood
J. Henry Kaiser.
INVENTOR.
Sylvester Bradley
By Knight Bros.
attys.

United States Patent Office.

SYLVESTER BRADLEY, OF BLOOMINGTON, ILLINOIS.

MACHINE FOR MAKING LIGHTNING-ROD CONNECTIONS.

SPECIFICATION forming part of Letters Patent No. 323,105, dated July 28, 1885.

Application filed May 1, 1884. (No model.)

*To all whom it may concern:*

Be it known that I, SYLVESTER BRADLEY, a citizen of the United States, residing at Bloomington, in the county of McLean and State of Illinois, have invented an Improvement in Devices for Making Lightning-Rod Couplings, of which the following is a specification.

The invention relates to those machines adapted to turn a spiral groove in the ends of lightning-rods or their coupling-pieces, by means of which said rods may be fixed together; and it consists, particularly, in improvements in the apparatus for forming such groove while the part being operated upon is held fixedly in position. The grooving-die is mounted within a sleeve adjustable in a hollow screw capable of being run forward or backward by a hand-lever. The part to be operated upon is inserted in the hollow screw, and the die being forced forward to its work by means of a set-screw and the holder turned, the desired spiral groove is formed.

In order that my invention may be more fully understood, I will proceed to describe it with reference to the accompanying drawings, in which—

Figure I is a perspective view of my improved machine for making spiral grooves. Fig. II is a side elevation of the die detached, and Fig. III a vertical section thereof.

1 2 are clamping-jaws; 3, guides for holding them in parallel position; 4, screw for clamping said jaws, and 5 the abutment of said screw. The rod or part, 6, to be operated upon is clamped firmly within the jaws 1 2 and inserted in the hollow screw-holder 7, traveling in head-block 8, and having suitable means, 9, for operating by hand or otherwise. The grooving-die is placed at one end of the holder 7, and consists of hardened steel point 10, having freedom of movement within a sleeve, 11, which is adjustable by means of a screw within the holder, and which may be removed at will for the substitution of a new die-point. 12 is a set-screw, moving in screw-threads on the interior of said sleeve 11, for the purpose of forcing the die up to its work.

It will be observed that, the set-screw being forced down so that the die-point will project, and the rod or coupling-piece to be operated upon being placed in the clamp and the holder turned, the die will be forced upon said rod or coupling and a spiral groove of the indicated form made thereon.

Having thus described my invention, the following is what I claim as new therein and desire to secure by Letters Patent:

1. In a machine for making lightning-rod and other connections, in combination with a clamp for holding the rod, the hollow screw carrying suitable grooving-die and having means of operation, substantially as described.

2. In combination with clamp, hollow screw-holding block, a grooving die having suitable means of adjustment, substantially as and for the purpose set forth.

3. The adjustable die consisting of thimble or sleeve, screw-threaded internally and externally, die, and set-screw.

SYLVESTER BRADLEY.

Witnesses:
H. P. FIELDER,
CHARLES L. CAPEN.